United States Patent [19]
Kaji et al.

[11] Patent Number: 5,515,299
[45] Date of Patent: May 7, 1996

[54] DEVICE FOR FINDING CENTROID COORDINATES OF FIGURES

[75] Inventors: Katsumi Kaji; Hiroshi Nemoto, both of Tokyo, Japan

[73] Assignee: Akio Kubo, Kamakura, Japan

[21] Appl. No.: 190,882

[22] Filed: Feb. 2, 1994

[51] Int. Cl.$^6$ .......................... G01B 21/00; G06F 17/10; G06F 19/00
[52] U.S. Cl. .................. 364/559; 33/121; 33/123; 33/124; 348/172; 364/463; 364/474.29
[58] Field of Search .................... 33/1 C, 121, 123, 33/124; 348/172; 364/463, 474.29, 559

[56] References Cited

U.S. PATENT DOCUMENTS

| | | | |
|---|---|---|---|
| 4,004,083 | 1/1977 | Norem | 348/172 |
| 4,127,941 | 12/1978 | Hoover | 33/1 C |
| 4,616,419 | 10/1986 | Kubo | 33/121 X |
| 4,621,959 | 11/1986 | Kishi et al. | 364/474.28 X |
| 4,706,201 | 11/1987 | Kish et al. | 364/474.29 |
| 4,791,576 | 12/1988 | Tanaka et al. | 364/474.29 |
| 5,115,569 | 5/1992 | Kubo | 33/1 M |

*Primary Examiner*—Edward R. Cosimano
*Attorney, Agent, or Firm*—David O'Reilly

[57] ABSTRACT

A device for finding the centroid coordinates of a figure that can calculate the centroid from a single time measurement of the figure and display the calculated centroid of the figure. The measuring device comprises a main body having a roller capable of running in a single direction and a measuring lever pivotably supported by the main body so as to be rotatable right or left from the running direction of main body on a horizontal plane. In the measuring device, the main body has a display and a calculating circuit. The tracer of the measuring lever traces the contour of the figure to measure the coordinates, areas, and lengths of the figure. At the same time, the calculating circuit computes the geometrical moments of areas successively and sums the geometrical moments of the areas. Finally, the calculating circuit divides the summed geometrical moment of the areas by an area of the figure to obtain the coordinates of the centroid of the figure. The display is showing the differences of the current coordinates of the measuring lever from the coordinates of the centroid of the figure.

2 Claims, 4 Drawing Sheets

DEVICE FOR FINDING CENTROID COORDINATES OF FIGURES

BACKGROUND OF THE INVENTION

1. Field of the Invention

The present invention relates to a device for finding the centroid coordinates of figures. More particularly, it concerns a measuring device which can measure the centroid coordinates of plane figures by tracing their contours.

2. Background Information

In the prior art, when finding a centroid of a linear figure a-g-f-e-d-c-b-a as shown in FIG. 3, for example, the figure is divided into sub-figures having known figure centroids, such as triangles a-b-g, b-g-f, and b-f-h and rectangle c-d-e-h, or a square, geometrical moments of their areas are individually calculated and summed up, and the summed moment is divided by the total area or the linear figure.

When finding the centroid of a curved figure as shown in FIG. 4, for example, the only way to obtain its centroid is by dividing the figure into a multiple or approximate triangles and applying the same method as above.

However, when finding linear figures such as those of FIG. 3, the prior method takes a long time because the amount of calculations increase with the number of sides, although it can obtain an accurate centroid.

Further the prior method can hardly obtain an accurate centroid for a curved figure as shown in FIG. 4 because it uses the approximation method. To obtain an accurate centroid, the figure has to divided more finely. This is practically impossible to do manually.

In view of solving the foregoing problems of the prior art, it is an object of the present invention to provide a device for finding the centroid coordinates of figures that can calculate the centroids at a single time of measurement of the figure and can display the calculated centroid on the figure.

SUMMARY OF THE INVENTION

Briefly, the foregoing object is accomplished by a device for finding the centroid coordinates of a figure according to the present invention. The device comprises a main body having a roller capable of running in a single direction and a measuring lever pivotably supported by the main body so as to be rotatable right or left from the running direction of the main body in a horizontal plane. In the device, the main body has a display, and a calculating circuit. A tracer of the measuring lever traces the contour of the figure to measure the coordinates, areas and lengths of the figure to be measured. At the same time, the calculating circuit computes the geometrical moments of an area successively and sums the geometrical moments of the area, and finally, the calculating circuit divides the summed geometrical moment of the area by an area of the figure to obtain the coordinates of the centroid of the figure. The display shows the differences of the current coordinates of the measuring lever from the coordinates of the centroid of the figure and the measuring lever is moved until the display indicates zero differences, thereby showing coordinates of the centroid of the figure.

Also, in the device of the present invention, the measuring lever includes a marking needle near the trace. The display shows the differences of the coordinates of the position of the marking needle from those of the figure centroid and the marking needle is moved until the display indicates zero, thereby showing the coordinates of the centroid of the figure.

As described above, the device for finding the coordinates of the centroid of a figure according to the present invention can determine the centroid as follows. As the tracer is moved along the contour of the figure, the device measures the areas of the figure. At the same time, the device successively calculates the geometrical moments of the areas. At the end of the figure measurements, the device divides the sum of the geometrical moments by the area of the figure, thereby obtaining the centroid.

The operation of the device is based on the theory described below. In FIGS. 5 and 6, for example, the geometrical moment Mx of the area for the x-axis can be given by $$Mx = \int\int_D y \, dx \, dy$$

where D is the domain of $y=f(x)$.

The y-coordinate of the figure centroid can be obtained by dividing the geometrical moment Mx by the area A of domain D.

$$y = \frac{\int\int_D y \, dx \, dy}{A}$$

Similarly, the x-coordinate of the figure centroid can be obtained by dividing the geometrical moment My by the area A of domain D.

$$x = \frac{\int\int_D x \, dx \, dy}{A}$$

where the geometrical moment Mx of the area is $$Mx = \int\int_{D \cdot E} y \, dx \, dy - \int\int_E y \, dx \, dy = \int\int_D y \, dx \, dy$$

A union of domains D and E is zero. This means that even if no geometrical moment of domain D is obtained directly, the geometrical moment of smaller domain E is subtracted from that of larger domain (D+E), leaving the geometrical moment of domain D.

Actual figures are hardly given in terms of functions like $y=f(x)$ For the reason, while tracing the figure contour, the contour is divided into minute sections and the geometrical moments of the minute areas are calculated successively and the whole geometrical moment of the area is obtained.

The foregoing and other objects, advantages, manner of operation and novel features of the present invention will be understood from the following detailed description when read in connection with the accompanying drawings.

BRIEF DESCRIPTION OF THE DRAWINGS

In the accompanying drawings:

FIG. 7 is a flow chart showing the operation of the device for finding the centroid coordinates of a Figure according to the present invention. Reference Numerals in Drawings refer to:

1=main body
2=measuring lever
3=display
4=input unit
5=roller
6=tracer
7=marking needle
8 and 9=push botton switches

DETAILED DESCRIPTION OF THE PREFERRED EMBODIMENT

The following describes in detail an embodiment according to the present invention with reference to the accompanying drawings.

Figure 1:
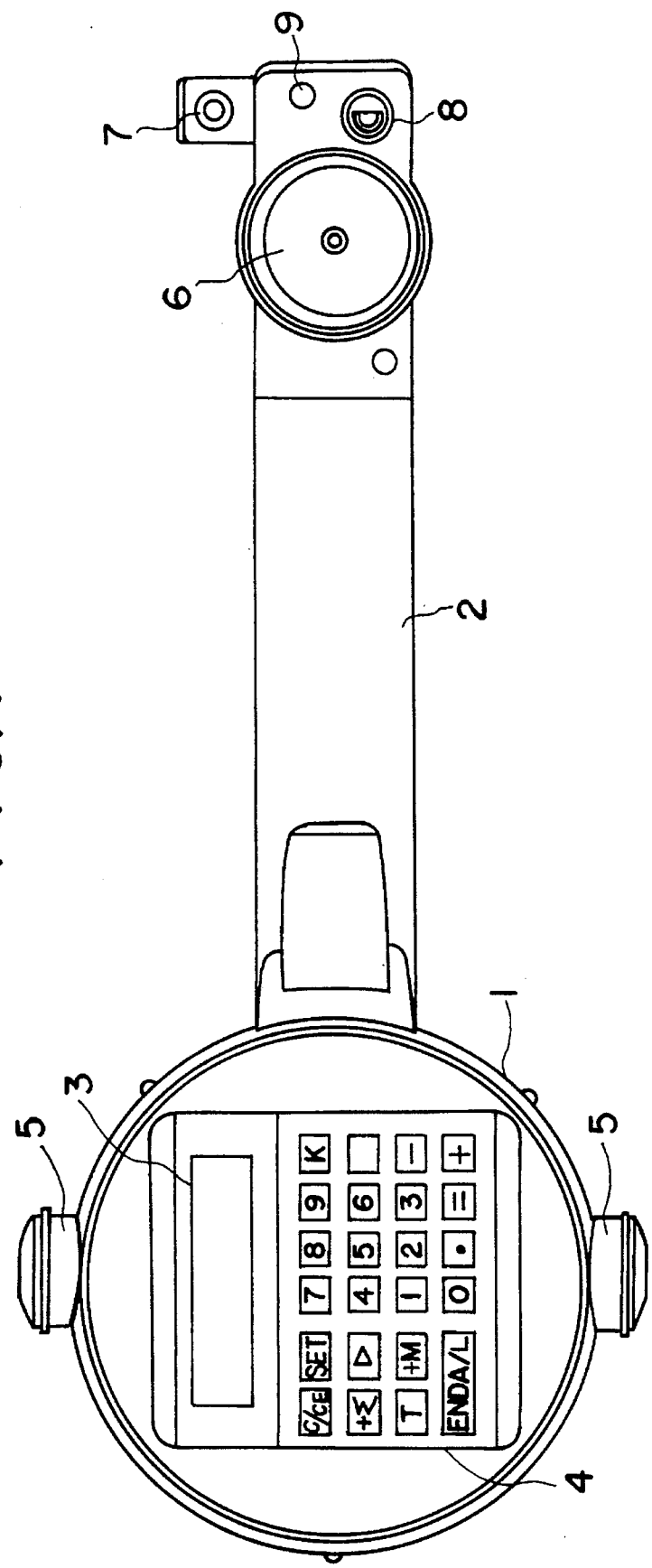
FIG. 1 is a plan view of an embodiment of a device for finding the centroid coordinates of figures according to the present invention.

FIG. 1 is a plan view of an embodiment of a device for finding the centroid coordinates of a figure. The device is comprised of main body 1 having roller 5 capable of running in a single direction and measuring lever 2 pivotably supported by main body 1 so as to be rotatable right or left from the running direction of main body 1 on a horizontal plane.

Main body 1 has display 3, input unit 4, and calculating circuit thereinside. Measuring lever 2 has tracer 6. Tracer 6 traces the contour of a figure to measure the coordinates, areas, and lengths of the figure. At the same time, the calculating circuit computes the geometrical moments of areas successively and sums the geometrical moments of the areas. Finally, the calculating circuit divides the first moment of the areas summed by the area of the figure to be measured to obtain the coordinates of the centroid of the figure. Display 3 shows the differences of the current coordinates of measuring lever 2 from the coordinates of the centroid of the figure. Measuring lever 2 is moved until display 3 indicates zero differences, thereby showing the coordinates of the centroid of the figure.

Measuring lever 2 has marking needle 7. Display 3 shows the differences of the coordinates of the position of marking needle 7 from those of the centroid of the figure. Marking needle 7 is moved until display 3 indicates zeros, therefore marking needle 7 indicates the coordinates of the centroid of the figure.

Measuring lever 2 also includes push button switches 8 and 9. For measuring a linear figure, as described hereinafter, activating push button 8 makes tracer 6 read the coordinates where tracer 6 is positioned. For measuring a curved figure, activating push button 9 makes tracer 6 continuously read the coordinates of tracer 6 as tracer 6 traces the contour of the curved figure.

Figure 2:
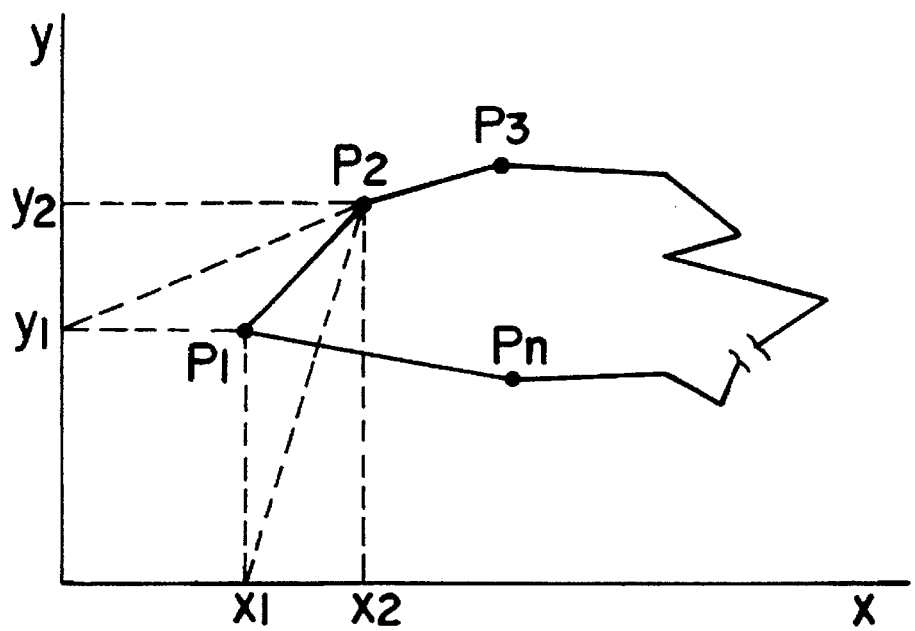
FIG. 2 is a pattern having a linear contour to explain the measurement of the figure centroid according to the present invention.
Figure 3:
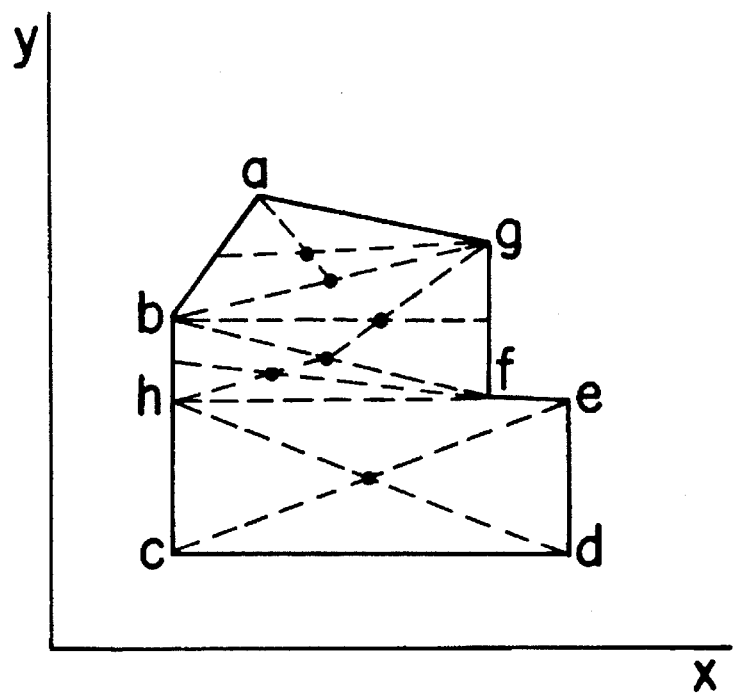
FIG. 3 is a pattern having a linear contour to explain the measurement of a figure centroid by prior art methods.
Figure 4:
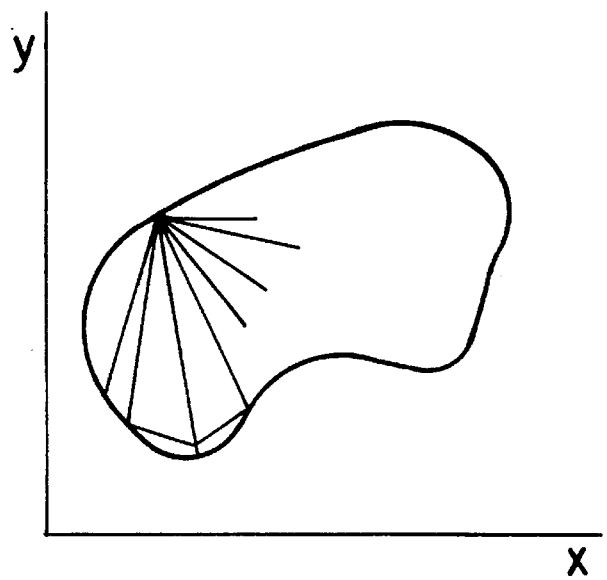
FIG. 4 is a curved contour pattern to explain the measurement of a figure centroid by prior art methods.

In turn, the following describes the operation of successive calculations of the geometrical moment of the area for the x-axis of an n-polygon shown in FIG. 2. To obtain the geometrical moment of area $My_1$ of a trapezium $P_1P_2x_2x_1$, the trapezium is divided into two triangles $P_1P_2x_1$ and $P_2x_2x_1$, and the following equation is used.

$$My_1 = (x_2 - x_1)(y_2^2 + y_2y_1 + y_1^2)/6$$

A geometrical moment $My_n$ of the area of a trapezium formed of a n-th sides can be given by $$My_n = (x_{n+1} - x_n)(y_{n+1}^2 + y_{n+1}y_n + y_n^2)/6 \quad (1)$$

Note that Eq. 1 above is applicable to a clockwise trace. For a counterclockwise trace, the sign should be inverted.

Similarly, the geometrical moment $Mx_n$ of the area for the y-axis of a trapezium formed of a n-th sides can be given by $$Mx_n = (y_n - y_{n+1})(x_{n+1}^2 + x_{n+1}x_n + x_n^2)/6 \quad (2)$$

Note that Eq. 2 above is applicable to a clockwise trace. For a counterclockwise trace, the sign should be inverted.

Also, note that point $P_{n+1}(x_{n+1}, y_{n+1})$ coincides with point $P_1(x_1, y_1)$ to close the figure.

If the device successively traces all the coordinates of vertexes $P_1, P_2, \ldots, P_n$, and $P_{n+1}$, geometrical moments of area My and Mx for the x-axis and y-axis can be respectively obtained $$My = \sum_{n=1}^{n} (1/6)(x_{n+1} - x_n)(y_{n+1}^2 + y_{n+1}y_n + y_n^2) \quad (3)$$

$$Mx = \sum_{n=1}^{n} (1/6)(y_n - y_{n+1})(x_{n+1}^2 + x_{n+1}x_n + x_n^2) \quad (4)$$

These equations mean to subtract the geometrical moments of smaller area E from the respective moments of larger area (D+E), leaving the geometrical moments Mx and My of area D to be measured.

$$2F = \sum_{n=1}^{n} (x_n + x_{n+1})(y_{n+1} - y_n) \quad (5)$$

where F>0 for a counterclockwise trace of F<0 for a clockwise trace.

$$S = |F|/2$$

where |F| is an absolute value of F.

Figure 5:
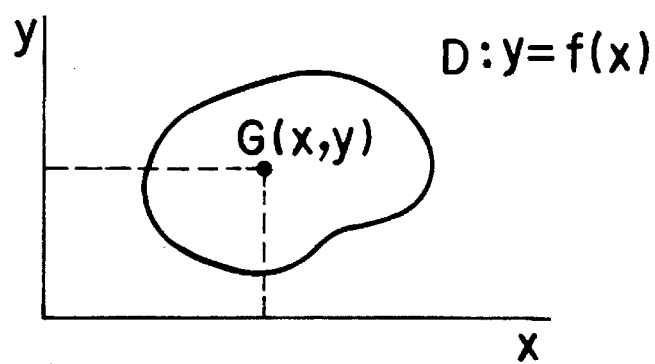
FIG. 5 is a pattern to explain the theory of measurement of the figure centroid according to the method of the present invention.
Figure 6:
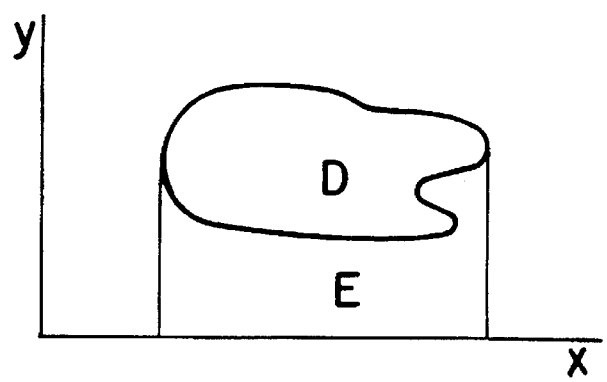
FIG. 6 is another pattern to explain the theory of measurement of the figure centroid according to the method of the present invention.

Coordinates G(x,y) of the centroid of the figure shown FIG. 5 can be obtained by dividing geometrical moments Mx and My of area by area S of the figure.

Note that the trace turning direction can be seen by checking the sign of F. It is not needed to limit the turning direction the tracing should take.

Figure 7:
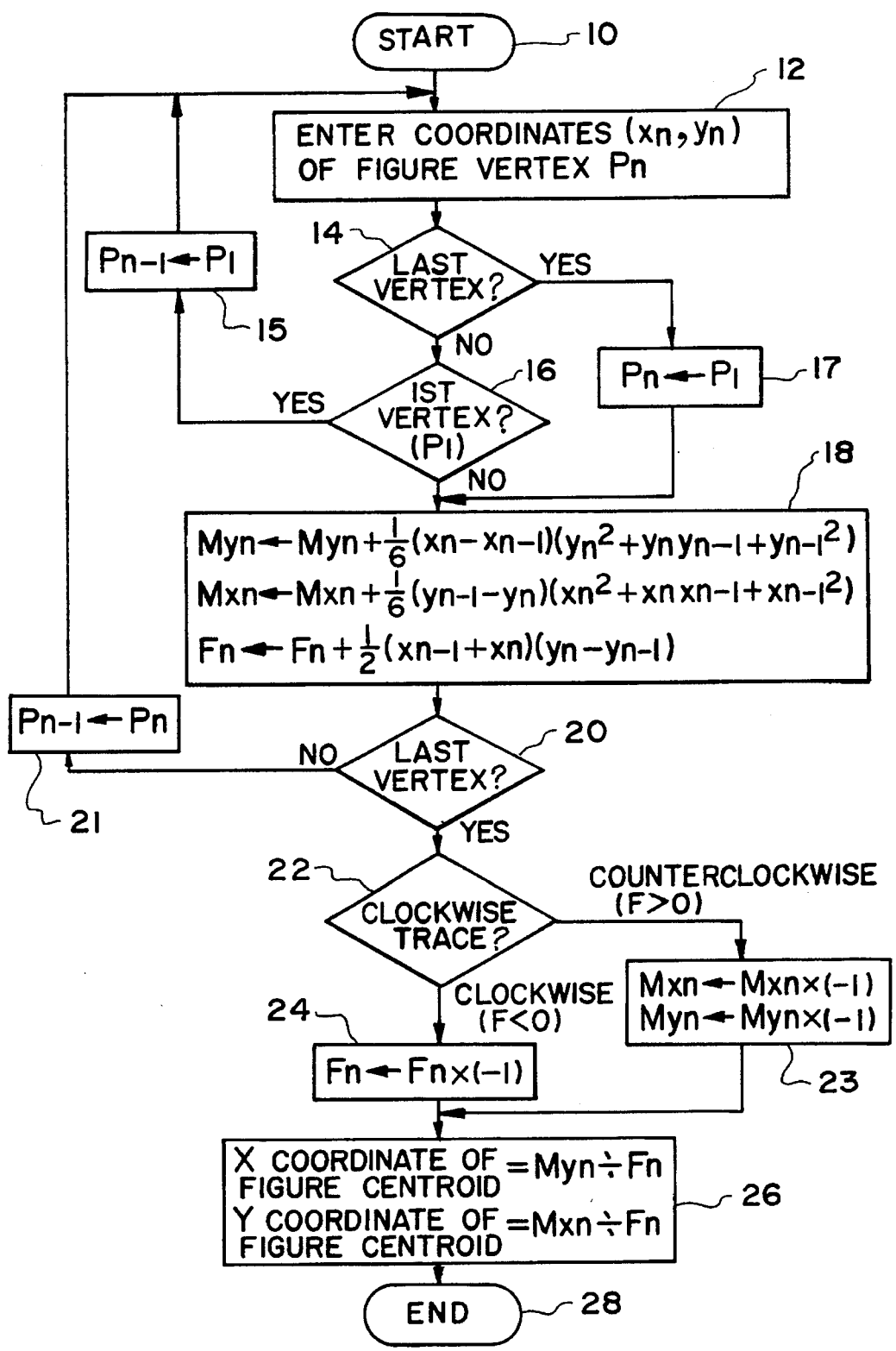

FIG. 7 is a flow chart showing the operation described above. When tracer 6 reaches each vertex of the linear figure, push button switch 8 indicated by Start 10 is pushed and the coordinate of each vertex indicated by subroutines 12 through 17, 20 and 21 are measured, and at the same time calculating circuit subroutine 18 computes geometrical moments $My_n$ and $Mx_n$ and $F_n$. Finally calculating circuit subroutine 26 divides the summed geometrical moments of the areas by the total area of the figure determined by subroutines 22 through 24 respectively to obtain coordinates of the figure centroid and then stop calculating at End 28

When measuring the centroid of a curved figure, push button switch 9 is pushed and tracer 6 continuously reads the coordinates of the contour of the figure as it traces the figure contour. A number of the coordinates are used to calculate Eq. 3, 4 and 5 and obtain the centroid of the figure. A large number of coordinates means that n in the equations becomes large enough (nearly infinite) that coordinates of the centroid obtained approach real values.

As described so far, the present invention provides the feature that allows the device according to the present invention to obtain the centroid of both linear figures and curved figures and can automatically display the centroid of the figure by tracing only the contour of a curved figure or reading the vertexes of a linear figure.

While the principles of the invention have been described above in connection with specific embodiments, and particular modifications thereof, it is to be clearly understood that this description is made only by way of example and not as a limitation on the scope of invention.

What is claimed is:

1. A device for finding the centroid coordinates of a figure comprising;

a main body having a roller capable of running in a single direction;

a measuring lever pivotably supported by the main body so as to be rotatable right or left from the running direction of the main body in a horizontal plane, the measuring lever having a tracer to trace a contour of the figure to be measures;

input means for successively reading coordinates where the tracer is positioned and input the coordinates to the main body; and the main body including a display and a calculating circuit; wherein the calculating circuit being constructed to compute the values $My_i$, $Mx_i$ and $F_i$ from the successively input coordinates $(x_i, y_i)$ $(i=1, \ldots, n$ where $(x_n, y_n)=(x_1, y_1))$ according to the following equations:

$$My_i=(x_{i+1}-x_i)(y_{i+1}^2+y_{i+1}y_i+y_i^2)/6$$

$$Mx_i=(y_i-y_{i+1})(x_{i+1}^2+x_{i+1}x_i+y^2)/6$$

$$F_i=\tfrac{1}{2}(x_i+x_{i+1})(y_{i+1}-y_i),$$

the calculating circuit adding the values of $My_i$, and $Mx_i$ and $F_i$ to the values $My_{i-1}$, $Mx_{i-1}$ and $F_{i-1}$, respectively as the measuring lever is tracing, and after the contour of the figure is traced, divides the values $My_n$ and $Mx_n$ by the value of $F_n$ respectively to obtain the coordinates of the centroid of the figure, and the display displaying the differences of the current coordinates of the measuring lever from the coordinates of the centroid of the figure.

2. The device for finding the centroid coordinates of a figure according to claim 1 wherein;

the measuring lever includes a marking needle adjacent to the tracer, and the display displaying the differences of the coordinates of the position of the marking needle from those of the centroid of the figure.

* * * * *